United States Patent [19]

Liles et al.

[11] 4,082,719

[45] Apr. 4, 1978

[54] SILICONE EPOXY CURABLE COMPOSITIONS

[75] Inventors: Donald T. Liles; Keith W. Michael, both of Midland, Mich.

[73] Assignee: Dow Corning Corporation, Midland, Mich.

[21] Appl. No.: 660,572

[22] Filed: Feb. 23, 1976

[51] Int. Cl.² .................... C08L 63/02; C08L 83/06; C08G 59/02
[52] U.S. Cl. .......................... 260/37 SB; 260/37 EP; 260/824 EP; 260/825; 260/46.5 R
[58] Field of Search ............ 260/824 EP, 825, 37 SB, 260/46.5 R

[56] References Cited

U.S. PATENT DOCUMENTS

| | | | |
|---|---|---|---|
| 3,070,559 | 12/1962 | Nitzsche et al. | 260/825 |
| 3,131,161 | 4/1964 | Nitzsche et al. | 260/825 |
| 3,842,141 | 10/1974 | Fetscher et al. | 260/824 EP |

*Primary Examiner*—Wilbert J. Briggs, Sr.
*Attorney, Agent, or Firm*—George A. Grindahl

[57] ABSTRACT

The admixing of a small amount of an organosilicon compound containing at least one silicon-bonded hydrogen atom with curable compositions comprising a hydroxyl-containing organosilicon compound, an epoxy compound and certain catalytic aluminum compounds to improve the performance of the cured composition is disclosed. The improved compositions are especially useful as a resin binder in molding compounds that are used to mold electronic devices.

29 Claims, No Drawings

4,082,719

SILICONE EPOXY CURABLE COMPOSITIONS

BACKGROUND OF THE INVENTION

1. Field of the Invention

The present invention relates to improved compositions comprising organosiloxanes and epoxy compounds. In one aspect the invention relates to novel curable compositions. In another aspect the invention relates to improved molding compounds.

2. Description of the Prior Art

The desirability of curable silicone composition and curable epoxy compositions as encapsulating materials for devices, especially for electrical and electronic devices, has been appreciated for a long time. However, certain of these compositions have deficiencies such as lack of abrasion resistance, poor resistance to moisture and/or heat, excessive brittleness and inferior electrical properties. In an attempt to avoid one or more of these deficiencies silicone-epoxy compositions have been prepared and disclosed. Of particular interest are the essentially anhydrous compositions described by Bank, et al. in U.S. Pat. No. 3,971,747.

The compositions of Bank, et al. are particularly useful as the binder resin in molding compositions. However, when electronic devices are enclosed with said molding compositions, for example as in a transfer molding process, leaving wire leads protruding from the cured molding composition, there is a tendency for water to "wick" up the lead. Under certain conditions, this wicking can interfere with the proper operation of the enclosed device.

One method of decreasing this wicking is commonly known as backfilling and comprises treating the encapsulated device under reduced pressure with a fluid, curable composition which will enter the microcracks and openings of the cured molding composition when the pressure is returned to normal. This method constitutes an extra step in the process of preparing encapsulated devices and adds to the cost of the device. A more economical method of reducing wicking is desired.

SUMMARY OF THE INVENTION

We have found that admixing with the molding composition a small amount of organohydriosilicon compound significantly reduces the water pick-up of a cured molding composition having protruding wire leads when compared to the water pick-up of a cured molding composition having no protruding wire leads. We have also found that the survivability of an encapsulated electronic device during steam autoclaving is improved by said admixing.

It is thus an object of the present invention to provide novel silicone-epoxy compositions.

A further object of the invention is to provide an improved molding compound.

These and other objects of the invention, which will be apparent to one skilled in the art upon consideration of the following detailed description and appended claims, are obtained by the compositions of this invention comprising a hydroxy-containing silicon compound, an epoxy compound, certain aluminum compounds that are catalysts for the curing of the compositions and a small amount of an organohydriosilicon compound.

DETAILED DESCRIPTION OF THE INVENTION

In accordance with the present invention there is provided a substantially anhydrous composition comprising (A) an organosilicon compound containing at least one silicon-bonded hydroxyl group; (B) a compound containing an average of more than one epoxy group; (C) a catalytic amount of an aluminum compound selected from the group consisting of aluminum trihydroxide, aluminum alcholates, aluminum acylates, salts of aluminum acylates and alkoxides, aluminosiloxy compounds and aluminum chelates, and (D) an organohydriosilicon compound containing at least one silicon-bonded hydrogen atom per molecule in an amount sufficient to provide no more than 0.1 percent by weight of silicon-bonded hydrogen, based on the combined weight of (A) and (B), said organosilicon compound (A) being present in an amount sufficient to provide at least 0.1 silicon-bonded hydroxy groups per epoxy group present in (B), and said substantially anhydrous composition being curable to a hard resinous material.

Any silicon compound or mixture of compounds, free of silicon-bonded hydrogen and containing at least one silicon-bonded hydroxyl group per molecule can be used as (A) in the practice of the present invention. The silanol-functional component can be monomeric or polymeric, a single monomer or polymer or a mixture of monomers and/or polymers. Thus, the operable organosilicon compositions include silanes, organopolysiloxanes characterized by $\equiv$SiOSi$\equiv$ units, silcarbanes characterized for example by an $\equiv$SiCH$_2$CH$_2$Si$\equiv$ or $\equiv$SiC$_6$H$_4$Si$\equiv$ type structure; and organosilicon polymers containing both silcarbane and siloxane structures. The term "organosilicon polymer" as used herein is intended to include dimers, homopolymers or copolymers having siloxane or silcarbane linkages. Inherent in the use of "organosilicon" is the fact that at least one silicon atom in the compound or polymer contains an organic substituent bonded to the silicon atom by means of a silicon-carbon bond.

The monomeric, hydroxy-functional organosilanes can be represented by the formula $(R^4)_{a'}(OZ)_{b'}Si(OH)_{4-a'-b'}$ in which $R^4$ is selected from the group consisting of monovalent hydrocarbon radicals and monovalent halogenated hydrocarbon radicals of no more than 30 carbon atoms, $R^4$ being bonded to the silicon atom by a silicon-carbon bond; and OZ is a hydrolyzable radical, $a'$ is an integer having a value of from 1 to 3 and $b'$ is an integer having a value of 0 to 2, the sum of $a' + b'$ being no more than 3. Thus, the silanes include $R_3^4SiOH$, $R_2^4(OZ)SiOH$, $R^4(OZ)_2SiOH$, $(R^4)_2Si(OH)_2$, $R^4OZSi(OH)_2$ and $R^4Si(OH)_3$.

Exemplary of the $R^4$ substituents are any monovalent hydrocarbon radicals such as alkyl radicals, such as methyl, ethyl, propyl, isopropyl, butyl, pentyl, isopentyl, neopentyl, hexyl, octyl, dodecyl, octadecyl, 3-methylheptyl, 6-butyloctadecyl, tertiary butyl, myricyl and 2,2-diethylpentyl; alkenyl radicals such as, vinyl, allyl, hexenyl, butenyl, 3-octenyl, 4,9-octadecadienyl and 4-nonenyl; alkynyl radicals such as propynyl, heptynyl, butynyl, decynyl; alkenynyl radicals such as 1-penten-3-ynyl, 2-ethyl-1-buten-3-ynyl; cycloaliphatic radicals such as, cyclobutyl, cyclopentyl, cyclohexyl, cycloheptyl, propylcyclohexyl, 2,4-dimethylcyclopentyl, cyclohexenyl, bicyclo[3.1.0]hexyl, tricyclo[3.2.1.1$^{3.8}$]-5-nonenyl, spiro[4.5]decyl, dispiro[4.1.4.2]-1-tridecenyl, decahydronaphthyl, 2,3-dihydroindyl and 1,2,3,4-tetrahydronaphthyl; aryl radicals such as, phenyl, tolyl, xylyl, 2-ethylphenyl, xenyl, naphthyl, anthracyl, pentacenyl, 3,4-methylethylphenyl, 9,9'-bifluoryl and 4-m-terphenyl; and aralkyl radicals such as 2-phenyl-octyl, 3-methyl-2-(4-isopropylphenyl)-hepthyl, benzyl, 2-ethyltolyl, 2-ethyl-p-cymyl, diphenylmethyl, 4,5-diphenylpentyl, 2-phenylethyl and 2-phenylpropyl and haloalkyl radicals such as chloromethyl, 3-chloropropyl, bromooctadecyl, 3,3,3-trichloropropyl, chloroisopropyl or 2(perfluoroalkyl)ethyl radicals in which the perfluoroalkyl radical is trifluoromethyl, perfluoroethyl, perfluoroisobutyl or perfluorooctadecyl; halocycloalkyl radicals such as bromocyclohexyl, chlorocyclopentyl or fluorocyclohexyl; haloaryl radicals such as 2,4-dichlorophenyl, dibromoxenyl, alpha,alpha,alpha-trifluorotolyl, iodonaphthyl and tetrachlorophenyl and haloaralkyl radicals such as 2-(chlorophenyl)ethyl, p-chlorobenzyl or 2-(bromophenyl)propyl.

The hydrolyzable group has the formula —OZ in which Z is any hydrocarbon or halogenated hydrocarbon group such as methyl, ethyl, isopropyl, octadecyl, allyl, hexenyl, cyclohexyl, phenyl, benzyl, beta-phenylethyl, 2-chloroethyl, chlorophenyl, 3,3,3-trifluoropropyl or bromocyclohexyl; any hydrocarbon ether radical such as 2-methoxyethyl, 2-ethoxyisopropyl, 2-butoxyisobutyl, p-methoxyphenyl or —(CH$_2$CH$_2$O)$_2$CH$_3$; or any acyl radical such as acetyl, propionyl, benzoyl, cyclohexoyl, acrylyl, methacrylyl, stearyl, naphthoyl, trifluoroacetyl, chlorobenzoyl or bromopropionyl. The preferred —OZ groups are those in which Z is an alkyl radical of 1 to 3 inclusive carbon atoms. The term "hydrolyzable group" means a group attached to the silicon which is hydrolyzed by water at room temperature to form silanol groups.

These hydroxy-functional silanes are known monomers which can be prepared by hydrolysis or partial hydrolysis of the corresponding hydrolyzable silanes. Those silanes in which R$^4$ is a lower alkyl (no more than 6 carbon atoms) or a phenyl radical are preferred. Exemplary silanes include (CH$_3$)$_3$SiOH, C$_6$H$_5$(C$_2$H$_5$)Si(OH)$_2$, CH$_3$(C$_6$H$_4$Cl)$_2$SiOH, (C$_6$H$_5$)$_2$Si(OH)$_2$, ClCH$_2$CH$_2$CH$_2$(CH$_3$)$_2$SiOH, CH$_3$(C$_3$H$_7$O)C$_6$H$_5$SiOH, CF$_3$CH$_2$CH$_2$(CH$_3$)Si(OH)$_2$ and C$_6$H$_5$(CH$_3$)(CH$_3$O)SiOH.

Hydroxyl-functional organopolysiloxanes can be represented by the formula

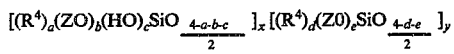

in which R$^4$ and Z are as previously defined, a is an integer having a value of 1 or 2, b having a value of 0 or 1, the sum of a + b being no more than 2, c having a value of 1 or 2, d having a value of from 1 to 3, e having a value of from 0 to 2, the sum of d + e being no more than 3, x having a value of at least 1, y having a value of 0 or more.

The hydroxylated organosilicon polymer can be in the form of a liquid, a high gum, a crystalline solid, or a resin. In those polymers of higher molecular weight (wherein y has a substantial value, for example 100 or more) it is preferred that the hydroxyl content be at least two weight percent of the polymer. As was the case with the monomeric hydroxy-functional silane, it is preferred that the R$^4$ substituents of the polymer be lower alkyl radicals of from 1 to 6 inclusive carbon atoms or the phenyl radical. It is also preferred that b and e both be very low in value; i.e., that the polymer be substantially fully hydroxylated rather than containing significant residual alkoxy groups.

Examples of the preferred siloxane units in the organopolysiloxane include (CH$_3$)$_2$(HO)SiO$_{1/2}$, (CH$_3$)$_2$SiO, CH$_3$(C$_6$H$_5$)(HO)SiO$_{1/2}$, CH$_3$SiO$_{3/2}$, CH$_3$(C$_6$H$_5$)SiO, C$_3$H$_7$(CH$_3$)SiO, C$_6$H$_5$(OH)SiO, (C$_6$H$_5$)$_2$SiO and C$_6$H$_5$(CH$_3$)$_2$SiO$_{1/2}$. Minor amounts of SiO$_2$ units may be present in the organopolysiloxane. The organopolysiloxanes are well-known and are prepared by techniques described in the prior art. For example, preferred resinous polymers having from 1.0 to about 1.8 organic substituents per silicon atom are readily prepared by hydrolyzing the corresponding organochlorosilanes with further condensation of the hydroxyl substituents to form ≡SiOSi≡ with some residual hydroxyl present. As will be described herein such resinous polymers are particularly suitable for use in molding compounds.

Hydroxyl-functional silcarbanes are also useful in the practice of the invention. As is well known, the silcarbanes are formed with divalent hydrocarbon bridges between silicon atoms. The divalent bridging hydrocarbon radicals may contain singly or in any combination groups such as methylene, vinylene, vinylidene, phenylene, cyclohexylidene, tolylene and toluenyl. The hydroxy-functional silcarbanes can be represented as

wherein Q is a divalent hydrocarbon radical and the remaining valences are satisfied by other Q radicals, the hydroxy group, R$^4$ radicals or —OSi≡ units.

It is to be understood that component (A) of the compositions of this invention can be a silane or a polysiloxane or silcarbane or their mixtures as long as there is at least one silicon-bonded hydroxyl groups per molecule.

Component (B) of the compositions of this invention is a compound containing an average of more than one epoxide group, i.e. the oxirane ring

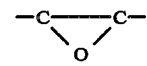

in its structure. The epoxy compound may be saturated or unsaturated, aliphatic, cycloaliphatic, aromatic or heterocyclic and may contain substituents such as ether groups and the like. The compound may be a monomer or an epoxy-functional polymer, and in either the form of a liquid or a solid resin as long as there is an average of more than one epoxy group per molecule.

The simple monomeric epoxy compounds include cyclohexene oxide and derivatives thereof, styrene oxide and glycidyl ethers. Exemplary of the glycidyl ethers are methyl glycidyl ether, ethyl glycidyl ether, propyl glycidyl ether, phenyl glycidyl ether and allyl glycidyl ether. Polyepoxides include vinyl cyclohexene dioxide, butadiene dioxide, 1,4-bis(2,3-epoxypropoxy)-benzene, 4,4'-bis(2,3-epoxypropoxy)diphenyl ether, 1,8-bis(2,3-epoxypropoxy)octane, 1,4-bis(2,3-epoxypropoxy)cyclohexane, the diglycidyl ether of polyethylene glycol, the diglycidyl ether of polypropylene glycol, isoprene diepoxide and bis(3,4-epoxy-6-methylcyclohexylmethyl)adipate.

The more complex epoxy compounds include well-known polyfunctional resins such as are obtained by reaction of polyhydric phenols with either polyfunctional halohydrins or polyepoxides or mixtures thereof. Illustrative of polyhydric phenols utilized in making such resins are mononuclear phenols, such as resorcinol, hydroquinone and catechol, or polynuclear phenols, such as p,p'-dihydroxy diphenyl dimethyl methane, p,p'-dihydroxybenzpohenone; p,p'-dihydroxydiphenyl; p,p'-dihydroxy dibenzyl; bis(4-hydroxyphenyl)sulfone; 2,2'-dihydroxy-1,1'-dinaphthyl methane; polyhydroxy naphthalenes and anthracenes; o,p-,o',p'-tetrahydroxy diphenyl dimethyl methane and other dihydroxy or polyhydroxy diphenyl or dinaphthyl methanes. Suitable polyepoxide compounds are listed above and others are well known - see U.S. Pat. No. 3,170,962 for a further listing of such polyepoxides and U.S. Pat. No. 2,592,560 for a description of reaction conditions used to synthesize the resins. When reacting polyhydric phenols with halogen compounds any of the epihalohydrins may be utilized. Examples of suitable halohydrins include 1-chloro-2,3-epoxypropane (epichlorohydrin), 1-bromo-2,3-epoxypropane, 1-fluoro-2,3-epoxypropane, bis(3-chloro-2-hydroxy propyl)ether, 1,4-dichloro-2,3-dihydroxy butane, 2-methyl-2-hydroxy-1,3-dichloropropane, bis-(3-chloro-2-methyl-2-hydroxy propyl)ether and other dichlorohydrins derived from aliphatic olefins, mannitol, sorbitol and other alcohols. The proportions of reactants as well as reaction conditions involved in the polyhydric phenol epihalohydrin synthesis are well known and are described in detail in U.S. Pat. Nos. 2,615,007 and 2,615,008. Of course, these polyepoxide resins may contain unreacted hydroxyl groups.

Another class of complex epoxy compounds is the cycloaliphatic polyepoxide monomers or prepolymers which contain at least one 5- or 6-membered ring (or heterocyclic ring with equivalent properties) which is substituted with the epoxide-functional group. In the polycyclic cycloaliphatic epoxides, the two rings are preferably independent, being joined by a bridging radical of at least one ester or ether linkage. A plurality of ester or ether linkages can alter the flexibility of the cured product. Examples of commercially available cycloaliphatic epoxide compounds include

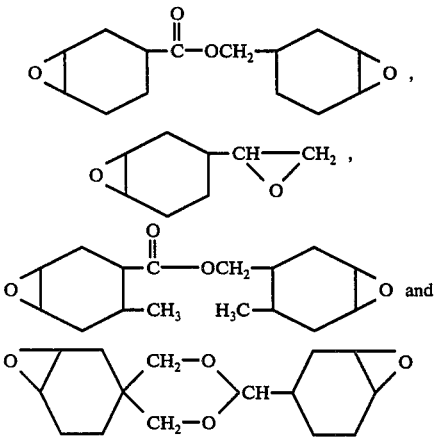

Further examples of cycloaliphatic epoxide compounds are described in U.S. Pat. No. 3,117,099.

Silylated epoxides are also useful in the practice of the invention. Monoepoxide units, such as

and

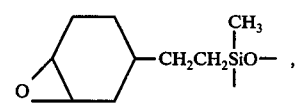

are exemplified in U.S. Pat. No. 3,445,877. Silylated polyepoxides are described in U.S. Pat. Nos. 3,223,577 and U.S. 3,516,965.

It is to be understood that component (B) of the compositions of this invention can be a single polyepoxy compound or a complex epoxy compound or their mixtures with monomeric epoxy compound as long as there is in component (B) an average of more than one, for example, 1.3, 2.0, 3.5, 4.0, and more epoxy groups per molecule.

To cure the compositions of this invention, the silanol-functional component is reacted with the epoxide component in the presence of an aluminum catalyst. The aluminum catalysts are selected from the group consisting of aluminum trihydroxide, aluminum alcoholates, aluminum acylates, salts or aluminum acylates and alkoxides, aluminosiloxy compounds and aluminum chelates.

Illustrative of the aluminum alcoholates are the trialkoxides, such as aluminum triethoxide and aluminum tri-isopropoxide; alkylarylaluminates, such as di-isopropoxidecresyl aluminate; and aryl aluminates, such as tri(o-cresyl)aluminate and tri(m-cresyl)aluminate. Preferred triaryl aluminates are those in which the —OR substituent represents the residue of a readily distillable phenolic compound, such as phenol or alkylphenols having 1 to 18 alkyl carbon atoms.

The aluminum acylates include aluminum triacylates, such as aluminum triacetate, aluminum tripropionate, aluminum tribenzoate, aluminum tristearate, aluminum tributyrate, aluminum-diacetate-monostearate and aluminum tri(3-methylbenzoate). Also included are hydroxylated or alkoxylated aluminum acylates such as aluminum hydroxyl/distearate, aluminum monoisopropoxide dibenzoate, aluminum hydroxy diacetate, aluminum dihydroxy monobutyrate and aluminum ethoxide distearate.

If desired the aluminum acylate catalysts can be formed insitu by adding an inactive compound, such as aluminum lactate, aluminum borate, or aluminum phenoxide and a carboxylic acid, such as stearic acid or benzoic acid to the composition.

Suitable aluminum salts include
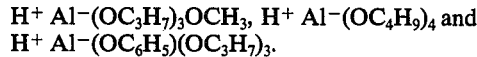

The reaction (condensation) products of aluminum alkoxides or aluminum acylates with ≡SiOH or silicon-bonded hydrolyzable radicals are also useful as catalysts. These aluminosiloxy compounds are more readily dispersed and are of greater solubility in the compositions of this invention, whereas certain of the other listed aluminum compounds do not have appreciable solubility in the components. Examples of such alumino siloxy catalysts include the reaction product of aluminum ethoxide with methyldimethoxysilanol, the reaction product of aluminum isopropoxide with dimethyldiacetoxysilane, the reaction product of aluminum hydroxy distearate with trimethylsilanol, the reaction product of aluminum diacetate benzoate with HO[(CH$_3$)$_2$SiO]H$_{25-60}$, the reaction product of aluminum propionate with 3-chloropropyltriethoxysilane and the like.

These aluminosiloxy compounds may be generated insitu, for example one may use methyltrimethyoxysilane and aluminum hydroxy diacetate to form the catalyst. It may be that, in all cases, the truely active catalytic species contains an Si—O—Al bond and that this species is formed when aluminum compounds are added to the silanol-containing component. It is obvious that other than the named aluminum compounds will react with the hydroxy-functional silicon atoms to form aluminosiloxy catalysts. For example trimethyl aluminum can be reaced with trimethylsilanol to form (CH$_3$)$_2$AlOSi(CH$_3$)$_3$ which acts as a catalyst for the curing reaction.

The aluminum chelate catalysts are known compounds formed by reacting aluminum alkoxide or acylates with nitrogen and sulfur-free sequestering agents containing oxygen as the coordinating atom, such as ethyl acetoacetate, acetylacetone, diethyl malonate and acetoacetic acid esters of high molecular weight alcohols, such as stearyl alcohol.

The aluminum-containing catalysts that are recited above and other suitable aluminum-containing catalysts are disclosed in U.S. application Ser. No. 567,148 to Bank, et al., filed on Apr. 11, 1975 and assigned to the assignee of this invention. Said application is hereby incorporated by reference to show the suitable aluminum-containing catalysts, how to make the catalysts and how to use the catalysts in the compositions of this invention.

The described aluminum catalysts are selective to the extent that, under the reaction conditions, there is a silanol-epoxy reaction involving ring-opening of the epoxy group to form ≡SiOCH—
|

OF course, the invention is not restricted to this reaction alone to account for the cure. The silanol-epoxy reaction is predominate and there is a minimum of silanol-silanol condensation as evidenced by the substantial lack of or only minimal evolution of water which accompanies the condensation of silanol groups. It has been found that the presence of water seriously inhibits the catalytic action of the described aluminum compounds in promoting the silanol-epoxy reaction. Other organometallic compounds, such as aluminum glycinate, aluminum borated, stannous stearated, cobalt octoate, tetraisopropyltitanate and lead acetate, catalyze silanol condensation to the extend that a foamed product is obtained and reaction of the silanol with the epoxide is minimal.

The improved properties of the curable compositions of this invention are obtained by the use of an organohydriosilicon compound (D). Any organosilicon compound containing at least one silicon-bonded hydrogen atom per molecule may be used in the practice of the present invention. The organohydriosilicon compound may be monomeric or polymeric and therefore may include silanes, siloxanes, silcarbanes and polymers comprising siloxane and/or silcarbane units. The organohydriosilicon compound may be a fluid, such as a liquid or a flowing gum or a solid, such as a non-flowing gum, a resin or a crystalline material.

Organohydriosilanes, suitable as (D) can be represented by the formula $(R^4)_{a'}(OY)_bSiH_{4-a'-b'}$. The meaning of $R^4$, $b'$ and $a'$, are as hereinbefore set forth for the organosilicon compound (A). Y is the hydrogen atom or Z as hereinbefore defined. Thus, suitable organohydriosilanes include $R_3^4SiH$, $R_3^4SiH_2$, $R^4SiH_3$, $R_2^4(OY)SiH$, $R_2^4(OY)SiH$, $R^4(OY)_2SiH$, and $R^4(OY)SiH_2$. Those organohydriosilanes wherein $R^4$ is a lower alkyl group, a vinyl group or a phenyl group are preferred. Y is a preferably H or an alkyl group of from 1 to 3 inclusive carbon atoms. Exemplary organohydriosilanes include $C_6H_5(CH_3)_2SiH$, $(C_6H_5)_2(CH_2=CH)SiH$, $(C_6H_5)_2SiH_2$, and $C_6H_5SiH_3$. Organohydriosilanes are well known in the organosilicon art and may be prepared by any suitable method.

Organohydriosiloxanes suitable as (D) can be represented by the formula $$[R_a^4(OY)_bH_cSiO_{\frac{4-a-b-c}{2}}]_x [R_d^4(OY)_eSiO_{\frac{4-d-e}{2}}]_y$$

in which $R^4$ and Y are as previously defined and the values for $a$, $b$, $a + b$, $c$, $d$, $e$, $d + e$, $x$, and $y$ are as hereinbefore set forth for the organosilicon compound (A). As in the case of the organohydriosilanes, $R^4$ is preferably a lower alkyl group or a phenyl group and Y is preferably H or an alkyl group of from 1 to 3 inclusive carbon atoms. In addition, it is also preferred that both $b$ and $e$ have a very low value, i.e. that the organohydriosiloxane consist essentially of siloxane units bearing silicon-bonded $R^4$ groups and silicon-bonded hydrogen atoms, and only very small amounts of silicon-bonded OY radicals such as OH.

Examples of preferred siloxane units in the organohydriosiloxanes include $(CH_3)_3SiO_{1/2}$, $(CH_3)_2HSiO_{1/2}$, $CH_3(C_6H_5)HSiO_{1/2}$, $(CH_3)_2SiO$, $(CH_3)HSiO$, $(C_6H_5)HSiO$, $(C_6H_5)_2SiO$, $(C_6H_5)CH_3SiO$, $CH_3SiO_{3/2}$, $C_6H_5SiO_{3/2}$, $(CH_3)_2(OH)SiO_{1/2}$, $(CH_3)(C_6H_5)(OH)SiO_{1/2}$, $CH_3(OH)SiO$ and $C_6H_5(OH)SiO$. It is to be understood that very small quantities of other siloxane units such as $SiO_{4/2}$ and $HSiO_{3/2}$, which are present in impurity amounts in commercial polyorganosiloxanes, may be present in the organohydriosiloxane.

Organohydriosiloxanes are well-known in the silicone art and may be prepared by any suitable technique. Poly(methylhydriosiloxanes) are preferred. For example, a highly preferred organohydriosiloxane can be prepared by cohydrolyzing $CH_3(H)SiCl_2$ and $(CH_3)_3SiCl$ in proper proportions to prepare a linear trimethylsiloxane-endblocked polymethylhydriosiloxane fluid. Another highly preferred organohydriosiloxane can be prepared by cohydrolyzing $C_6H_5SiCl_3$ and $H(CH_3)_2SiCl$ in approximately 3 to 1 mole ratio to produce a resinous organohydriopolysiloxane. The resinous product may be used as the hydroxylated from (containing SiOH) or as the dehydroxylated form (essentially free of SiOH).

Organohydriosilcarbanes are alos useful as (D) in the practice of this invention. They can be represented by the unit

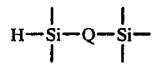

wherein Q is a divalent hydrocarbon radical, such as —CH$_2$—, —CH$_2$CH$_2$——C$_6$H$_4$—, CH$_3$CH= and —C$_6$H$_{10}$—, and the remaining valences are satisfied by other Q radicals, R$^4$ radicals, OH radicals, H radicals, and —SiO≡ radicals.

The curing of the compositions of this invention is accomplished by heating under substantially anhydrous conditions a mixture of the described components. Substantially anhydrous conditions is taken to mean that there is less than 0.5 weight percent, preferably less than 0.05 weight percent free water present in the mixture of components. The curing temperature will vary depending upon the specific components present, the amount and activity of the particular aluminum catalyst utilized and the nature of any additives or fillers in the reaction mixture. Generally the temperatures will vary from 20° to 250° C. Certain of the catalysts are latent to the extent that they possess no significant activity below 100° C. This is an advantage in that the compositions of this invention have a long shelf life and the inherent difficulties of premature cure are minimized. Of course, the time necessary to complete the curing will vary with temperature also. Generally, a temperature which provides complete curing in about 30 minutes or less is preferred.

The quantity of components (A) and (B) utilized in the compositions of this invention can vary over a wide range depending upon the nature of the desired product. If desired, the epoxide can be combined with less than a chemical equivalent amount of the silanol. The term "chemical equivalent amount" refers to the amount of organosilicon compound needed to furnish one silanol group for every epoxy group. That amount is, of course, a function of the silanol content of the organosilicon compound. Generally, the compositions of this invention comprise a chemical equivalent amount of 0.1:1 to 5:1 of organosilicon compound to epoxy compound. When fillers are combined with the compositions of this invention, it is preferred to utilize 0.5:1 to 2:1 chemical equivalent of organosilicon to epoxy component.

The quantity of the organohydriosilicon compound (D) utilized in the compositions of this invention is narrowly limited. Very small quantities of (D), for example quantities sufficient to provide as little as 0.003 percent by weight or less of silicon-bonded hydrogen based on the combined weight of (A) and (B) have been found to be effective; however, quantities of (D) sufficient to provide silicon-bonded hydrogen in excess of 0.1 percent by weight, based on the combined weight of (A) and (B) have been found to be of no value or, in some instances, have been found to be detrimental. It should be noted that certain organohydriosilicon compounds, for example methylhydriocyclopentasiloxane and others, have even narrower limits for the amount of silicon-bonded hydrogen that is effective for the purposes of this invention. The effective amount of any particular organohydriosilicone compound within the limits for silicon-bonded hydrogen stated herein should be determined by simple experimentation using the lead seal test as hereinafter described. Trimetylsiloxane-endblocked poly(methylhydriosiloxane) is preferably used in an amount of up to 0.5 percent by weight thus providing up to 0.01 percent by weight of silicon-bonded hydrogen, based on the combined weight of (A) and (B).

Catalytic amounts of the aluminum compound must be present. The specific amount of catalyst is not critical so long as there is a minimum amount necessary to promote the curing reaction. This minimum effective amount will vary with the specific catalyst, the components utilized and the curing conditions. If the aluminum catalyst is soluble in one or more of the components the effective amount is less than when the the same aluminum compound is utilized in combination with components in which material is insoluble. Catalytic amounts as low as 0.05 percent by weight based on the total weight of (A) plus (B) have been observed to promote the reaction at a practical rate. Amounts greater than 5 weight percent do not provide any further optimization of cure rate or properties in the reaction product.

The components of the compositions of this invention may be mixed in any desired manner. When low viscosity liquids are utilized, stirring may be sufficient to provide a homogeneous mixture of the components. Solid materials can be mixed by milling or blending of powders. If desired, solvents may be added to facilitate mixing.

The compositions may contain conventional additives, such as plasticizers, release agents, process aids, cure control additives, fire retardants and pigments, such as titanium dioxide, carbon black and iron oxide. These compositions can also include solid fillers, both reinforcing fillers and extending fillers as conventionally used in other silicone compositions. The reinforcing fillers preferably are the reinforcing silica fillers, both treated and untreated. The reinforcing silica fillers include fume silica, silica aerogel, silica xerogel, and precipitated silicas. The reinforcing silica fillers can be treated with the conventional organosilicon treating agents which are well known in the art and include organosilanes, such as methyldichlorosilane or glycidoxypropyltrimethoxysilane, organosiloxanes such as hexamethylcyclotrisiloxane and organosilazanes such as hexamethyldisilazane. Examples of extending fillers include, asbestos, crushed fused quartz, aluminum oxide, aluminum silicate, zirconium silicate, magnesium oxide, zinc oxide, talc, diatomaceous earth, iron oxide, calcium carbonate, clays, titanium dioxide, zirconia, mica, glass, sand, carbon black, graphite, barium sulfate, zinc sulfate, wood, flour, cork and fluorocarbon polymer powder among others. Materials which inactivate the aluminum catalyst or otherwise adversely affect the curing reaction, such as significant quantities of certain amines, are to be excluded.

These curable compositions vary in physical properties and form. They range from fluids to powderable solids. Curing of these compositions, such as by exposure to elevated temperatures, result in gelation of the compositions to form hard resinous materials. Thus, the curable compositions have a variety of uses, such as surface coatings, as impregnating resins for laminates, as adhesives, as a powder coating, as pottings and castings for electrical devices and as binders for molding compounds.

Preferred curable compositions contain at least 0.1 chemical equivalents of organosilicon reactant per epoxy-functional equivalent; more preferred compositions containing from 0.5:1 to 1.5:1 chemical equivalents of the silanol-functional organosilicon compound in which the organosilicon compound contains at least 2.5 weight percent silicon-bonded hydroxyl groups.

In a specific embodiment, a curable composition comprises (A) from 10 to 60 weight percent of a phenyl polysiloxane resin having a degree of substitution of 1.0 to 1.7 and a silicon-bonded hydroxyl content of from 2.5 to 10 weight percent; (B) from 40 to 90 weight percent of a polyepoxide, i.e. those having two or more

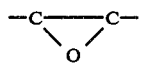

groups per molecule, (C) from 0.1 to 5 weight percent, based on the combined weight of (A) and (B) of an aluminum acylate catalyst, and (D) up to 0.5 percent by weight based on the combined weight of (A) and (B) of a poly(methylhydriosiloxane).

The preferred phenylpolysiloxane resin (A) of the specific embodiment is of the formula

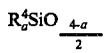

in which $R^4$ is an alkyl radical of from 1 to 3 carbon atoms or phenyl radical and $a$ has an average value of from 1.0 to 1.7. The phenyl to silicon ratio of such resins is generally in the range of 0.20 to 1.5. Thus, the phenylsiloxane resin can contain units such as $C_6H_5SiO_{3/2}$, $CH_3SiO_{3/2}$, $C_2H_5SiO_{3/2}$, $C_3H_7SiO_{3/2}$, $C_6H_5(CH_3)SiO$, $(CH_3)_2SiO$, $CH_3(C_3H_7)SiO$, $(C_6H_5)_2SiO$ and minor amounts of triorganosiloxy groups such as $(CH_3)_3SiO_{1/2}$. Preferably the organosiloxane resin contains from 2.5 to 7 weight percent silicon-bonded hydroxyl groups.

Exemplary of the epoxy resins (B) of the specific embodiment are the reaction products of polyhydric phenols with epihalohydrins (glycidyl ethers of polyhydric phenols), such as the polyglycidyl ether of 2,2-bis-(parahydroxyphenyl)propane; and the polyglycidyl ether of the novolac condensation product such as the triphenylols, pentaphenylols and heptaphenylols described in U.S. Pat. No. 2,885,385. Other exemplary epoxy resins are the cycloaliphatic polyepoxides having an epoxide equivalent (grams of resin containing one gram equivalent of epoxide) of more than 65 such as vinyl cyclohexene dioxide and 3,4-epoxycylohexylmethyl-3,4-epoxycyclohexanecarboxylate. A detailed description of cycloaliphatic polyepoxides can be found in Canadian Pat. No. 868,444. Of the aluminum acylate catalysts, the stearates, distearates and benzoates are preferred.

In addition to the four necessary components and the optional conventional additives and pigments as previously described, the curable compositions can contain non-essential ingredients such as solvents and diluents. It is within the scope of the present invention to include reactive diluents in the compositions. Reactive diluents, such as hydroxyl-terminated phenyl methyl polysiloxane fluid or phenyl glycidyl ether, can be added to the high viscosity or solid resins of the specific embodiment to provide easier mixing and handling of the uncured composition. Reactive diluents can also be used to modify the properties of the cured composition. For example, inclusion of sufficient quantities of dibromophenyl glycidyl ether or the diglycidyl ether of tetrabromo-bisphenol-A will render the cured composition substantially self-extinquishing which is of particular interest when encapsulating electrical devices.

Fillers can also be added to compositions utilized as encapsulants and molding compounds. The solid inorganic fillers, either particulate or fibrous, are generally present in an amount in the range of 30 to 90 weight percent based on the total weight of molding compound. Of the previously-described fillers, granular fused silica and/or glass fibers are preferred when the molding compound is utilized to mold or encapsulate electronic devices.

The improved performance of compositions of this invention is of particular value when the compositions are used to protect sensitive electronic devices such as integrated circuits.

In one test of this improved performance 4011 CMOS devices are molded in the composition of this invention and the molded devices are then autoclaved at 121° C. in an atmosphere of steam at a gauge pressure of 15 p.s.i. The autoclaved devices are tested periodically to determine if they are alive or dead and the percentage of dead devices is noted as a function of time in the steam autoclave. Another more convenient test that is used to measure the effectiveness of the compositions of this invention is referred to as the lead seal test. This test involves the simultaneous autoclaving of encapsulated integrated circuit (IC) devices or "dummy" devices (lead frames, but without an actual IC attached) along with plastic bars having no leads. These plastic bars are of the same material and the same size and shape as the plastic packages used for the dummy encapsulation. Autoclave conditions are 45min at 15 p.s.i. steam, 121° C. The weight gain after autocalving is recorded for both the IC devices and the bars. The weight gain for the devices is always larger than that of the bars, indicating that this increased weight gain is related to the presence of the wire leads on the dummy devices. The difference between the weight gain of the devices and the weight gain of the bars is expressed as delta ($\Delta$) units in grams $\times$ $10^4$ and is a direct measure of the effectiveness of the molding composition. Thus, a poor composition gives a $\Delta$ value on the order of 3 to 5 (g $\times$ $10^4$) while a good composition exhibits a $\Delta$ value of 0.5 to 1.5 (g $\times$ $10^4$). In any event, the compositions of this invention have a smaller $\Delta$ value than do the corresponding composition that do not contain the organohydriosilicon compound.

In performing the lead seal test a minimum of 10 devices and 10 bars are usually used for one test. Each bar and each device can be weighed separately, but it is much more convenient to weight the bars together and the devices together and then use a numerical average of each group. The lead seal test is an accurate method and the values obtained can be reproduced by subsequent testing. Values obtained from separate lead seal tests using the same material usually vary not more than ±0.3 $\Delta$ units.

This invention also relates to a method of protecting an article, such as an electrical or an electronic device, from the adverse effects of the environment, such as damage by water. This method comprises the steps of (I) mixing appropriate amounts of the components (A), (B), (C), and (D), hereinbefore disclosed, (II) surrounding the article to be protected with the homogeneous mixture before said mixture cures and (III) allowing the surrounding mixture to cure.

Preparation of the homogeneous mixture of (A), (B), (C), and (D) has been described above and does not need to be repeated. Specific techniques for preparing the homogeneous mixture are disclosed in the Examples.

The device to be protected may be surrounded in any suitable manner such as by injection molding, transfer molding, compression molding, encapsulating, flowing, brushing, dipping, spraying, and fluid bed immersion. In the electronic molded devices art a preferred method of surrounding the part is by transfer molding. The best manner for surrounding an article is often dictated by the properties of the homogeneous mixture, such as viscosity and cure rate.

When the article to be protected has been properly surrounded with the homogeneous mixture, the mixture is allowed to cure. Depending on the mixture of the reactants and catalytic activity and concentration of the aluminum-containing catalyst in the mixture, this curing process may be conducted at temperatures as low as room temperature. In many instances a more rapid curing rate is desired and higher curing temperatures are advantageously used. Of course, the curing temperature should not be so high as to damage the article being surrounded or degrade the cured homogeneous mixture.

The compositions and method of this invention are particularly useful for protecting electronic devices such as transistors and integrated curcuits wherein the electrical contact to the device comprises one or more conductors, such as wires, which protrude from the cured protecting mixture. By some as yet unknown mechanism the cured compositions of this invention reduce water pick-up of these devices and increases their survivability in moisture. While not wanting to be limited by theory, we believe that a small amount of the organohydriosilicon component in the mixture is positioned on the wire leads during or after the surrounding step in the method of this invention. It is believed that the organohydriosilicon compound at the wire-mixture interface serves to improve the bond between the cured mixture and the wire lead, thereby decreasing the tendency of water to "wick" up the lead. The electrical integrity of the electronic device is thus better preserved. This adhesion theory is not a complete explanation of the effectiveness of the comositions of this invention, since the compositions of this invention have been found to release from the metal surfaces of the mold more easily than do the aluminum-catalyzed silicone epoxy compositions of the prior art having no organohydriosilicon compound.

The following examples are illustrative of the described method and curable compositions. Such examples are not intended as limiting of the invention set forth in the claims. In the examples all percentages refer to weight percent, unless otherwise specified.

EXAMPLE 1

A silicone-epoxy molding composition was prepared with a phenylmethylsilicone resin and a commercially available cresol novolac epoxy resin. The silicone resin contained $CH_3SiO_{3/2}$ units, $C_6H_5SiO_{3/2}$ units, $(C_6H_5)_2SiO$ units and $C_6H_5(CH_3)SiO$ units and had an organic group/silicon ratio of approximately 1.2, a $C_6H_5/Si$ ratio of approximately 0.6 and a hydroxy content of 5 percent. The epoxy resin was epoxidized cresol novolac having a molecular weight of about 1170 and an epoxide equivalent weight of 230.

Ten parts of the silicone resin, 15 parts of the epoxy resin, 69.875 parts of amorphous silica, (5.0 parts of 1/32 inch glass fibers) and 0.125 parts of lampblack were milled on a two-roll mill until homogeneous. The rolls were variably heated as desired. After cross milling the mixture several times a catalyst mixture consisting of 0.187 parts of aluminum benzoate and 0.075 parts of a process aid was milled into the mixture for two minutes. The mixture was allowed to cool and was then crushed to provide a granular molding compound to be used as a control composition for comparison purposes.

Several compositions of this invention were prepared in the same manner as the control composition except that 0.5 parts of the silicone resin were replaced with an equal amount of the organohydrosilicon compound indicated in Table I.

The control composition containing no organohydriosilicon compound and the resulting four compositions of this invention were used to prepare molded dummy lead frames and plastic bars containing no lead frames, as hereinbefore described. Transfer molding conditions, using a 20 cavity mold, were 1000 p.s.i. (6.89 megapascals) at 177° C. for 1.5 minutes and a post cure at 200° C. for 2 hours. The moldings were trimmed and formed to remove flash and to provide a 5 mm lead wire. The moldings were then weighed and autoclaved with 15 p.s.i. steam at 121° C. for 45 minutes. The autoclaved moldings were then removed from the autoclave and allowed to cool for approximately 10 minutes and re-weighed. The weight gain of the molded dummy lead frames minus the weight gain of the plastic bars without lead frames was calculated for each composition and then multiplied by 10,000 to give a Δ value as hereinbefore defined. Table I shows that the four compositions of this invention all have lower Δ values than the control composition. Example 4 shows that a lower Δ value for a composition results in an increased survivability of a molded electronic device in the autoclave.

TABLE I

| Organohydriosilicon Compound | Silicon-bonded hydrogen (% of total resin) | Δ |
| --- | --- | --- |
| None | 0 | 3.2 |
| $(C_6H_5)_2Si(OSiMe_2H)_2$ | 0.012 | 2.5 |
| $(C_6H_5SiO_{3/2})_{4y}(HMe_2SiO_{1/2})_y$ (dehydroxylated) | 0.004 | 2.5 |
| $(C_6H_5SiO_{3/2})_{3x}(HMe_2SiO_{1/2})_x$ (hydroxylated) | 0.005 | 1.6 |
| $Me_3SiO(MeHSiO)_{\sim 30}SiMe_3$ | 0.031 | 1.2 |

EXAMPLE 2

Silicone-epoxy molding compositions were prepared as in Example 1, i.e. the indicated amount of the organohydriosilicon compound was admixed in place of an equal amount of silicone resin. The compositions were molded and tested as in Example 1.

Table II summarizes the organohydriosilicon compounds that were used and the Δ values that were obtained. This Example shows that the poly(methylhydriosiloxane), $(MeHSiO)_5$, should not be used in amounts as large as 2 percent, based on the weight of silicone resin plus the epoxy resin.

TABLE II

| Organohydriosilicon Compound (w% of total resin) | Silicon-bonded hydrogen (w% of total resin) | Δ |
| --- | --- | --- |
| None | 0 | 3.2 |
| $(MeHSiO)_5$ (2%) | 0.034 | 4.0 |
| $(MeHSiO)_5$ (1%) | 0.017 | 2.3 |
| $(C_6H_5)_2(CH_2=CH)SiH$ (2%) | 0.010 | 3.4 |
| $(C_6H_5)_2(CH_2=CH)SiH$ (1%) | 0.005 | 2.4 |

TABLE II-continued

| Organohydriosilicon Compound (w% of total resin) | Silicon-bonded hydrogen (w% of total resin) | Δ |
|---|---|---|
| Si(OSiMe$_2$H)$_4$ (2%) | 0.025 | 2.8 |
| (C$_6$H$_5$)Si(OSiMe$_2$H)$_3$ (2%) | 0.019 | 2.6 |

EXAMPLE 3

A silicone-epoxy molding composition of this invention containing 4 percent by weight of a trimethylsiloxane-endblocked polymethylhydriosiloxane fluid and 0.064 percent by weight of silicon-bonded hydrogen based on the weight of the silicone resin plus epoxy resin had a Δ value of 2.4 after the usual post cure. When the composition was post cured for 20 hours at 200° C. a Δ value of 1.7 was observed.

EXAMPLE 4

A control composition was prepared as in Example 1 except that the catalyst mixture consisted of 0.125 parts of aluminum benzoate and 0.21 parts of a process aid and the silica filler was a ground fused quartz having a smaller particle size than the amphorus silica. A composition of this invention was prepared wherein 0.125 parts of the trimethylsiloxane-endblocked poly(methylhydriosiloxane) fluid of Example 1 was admixed with the control composition. The control composition had a Δ value of 3.0 and the composition containing the organohydriosilicon compound had a value of 2.1.

The control composition and the composition of this invention listed above were used to mold 4011 CMOS devices. Molding conditions and post cure conditions were the same as in Example 1. The molded 4011 CMOS devices were then autoclaved in steam at 121° C. The autoclaved devices were periodically removed from the autocalve and tested on a Teradyne J133C IC test circuit. Devices were considered to be dead if they did not demonstrate the output characteristics specified by the manufacturer of the CMOS device. After 208 hours of autoclaving the devices that were molded with the molding composition of this invention containing the trimethylsiloxane-endblocked poly(methylhydriosiloxane) fluid experienced no failures. The devices that were molded with the control composition experienced no failures after 95 hours, 6.2 percent dead devices after 115 hours, 12.5 percent devices after 172 hours and no further failures for the balance of the 208 hours of autoclaving.

This Example shows that the compositions of this invention are useful for providing increased protection from water for devices that are molded therewith.

That which is claimed is:

1. A substantially anhydrous composition comprising
   (A) an organosilicon compound containing at least one silicon-bonded hydroxyl group;
   (B) a compound containing an average of more than one epoxy group;
   (C) a catalytic amount of an aluminum compound selected from the group consisting of aluminum trihydroxide, aluminum alcoholates, aluminum acylates, salts of aluminum acylates and alcoxides aluminosiloxy compounds and aluminum chelates, and
   (D) an organohydriosilicon compound containing at least one silicon-bonded hydrogen atom per molecule in an amount sufficient to provide no more than 0.1 percent by weight silicon-bonded hydrogen based on the combined weight of (A) and (B), said organosilicon compound (A) being present in an amount sufficient to provide at least 0.1 silicon-bonded hydroxy groups per epoxy group present in (B), and said substantially anhydrous composition being curable to a hard resinous material.

2. A composition in accordance with claim 1 wherein compound (B) is a polyepoxide.

3. A composition in accordance with claim 2 wherein component (A) is a hydroxy-functional organopolysiloxane of the formula

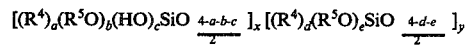

in which R$^4$ is a monovalent hydrocarbon radical selected from the group consisting of alkyl radicals of from 1 to 6 inclusive carbon atoms and the phenyl radical; R$^5$ is an alkyl radical of from 1 to 6 inclusive carbon atoms; $a$ is an integer having a value of 1 or 2; $b$ having a value of 0 or 1, the sum of $a + b$ being no more than 2; $c$ is an integer having a value of 1 or 2, $d$ is an integer having a value of from 1 to 3; $e$ having a value of 0 to 2, the sum of $d + e$ being no more than 3; $x$ having a value of at least 1 and $y$ having a value of 0 or more.

4. A composition in accordance with claim 3 wherein the organopolysiloxane (A) is present in an amount sufficient to provide from 0.5 to 1.5 ≡SiOH per epoxy group present in (B).

5. A composition in accordance with claim 4 wherein said organopolysiloxane is a phenylpolysiloxane resin having a degree of substitution of from 1.0 to 1.7; a phenyl to silicon ratio of 0.2 to 1.5 and a silicon-bonded hydroxyl content of from 2.5 to 10 weight percent.

6. A composition in accordance with claim 5 wherein the polyepoxide (B) is selected from the group consisting of the glycidyl ethers of polyphenols and cycloaliphatic polyepoxides.

7. A composition in accordance with claim 6 wherein the phenylpolysiloxane resin is of the formula

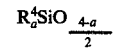

in which R is an alkyl of from 1 to 3 inclusive carbon atoms, $a$ has an average value of from 1.0 to 1.7, the phenyl to silicon ratio being in the range of 0.2 to 1.5, the silicon-bonded hydroxyl content of said resin being in the range of 2.5 to 7.5 weight percent.

8. A composition in accordance with claim 7 wherein the organohydriosilicon compound is a poly(methylhydriosiloxane).

9. A composition in accordance with claim 8 wherein the aluminum catalyst (C) is an aluminum acylate.

10. A composition in accordance with claim 9 comprising
    (A) from 10 to 60 weight percent of the phenylpolysiloxane resin
    (B) from 40 to 90 weight percent of the polyepoxide
    (C) from 0.1 to 5 weight percent, based on the combined weight of (A) and (B) of aluminum acylate catalyst, and
    (D) up to 0.5 weight percent based on the combined weights of (A) and (B) of poly(methylhydriosiloxane).

11. A composition in accordance with claim 10 containing a solid filler.

12. A composition in accordance with claim 11 wherein the filler is present in an amount in the range of 30 to 90 weight percent based on the total weight of the composition.

13. A composition in accordance with claim 12 wherein the filler includes granular fused silica and glass fibers.

14. A composition in accordance with claim 11 wherein the polyepoxide is an epoxy functional cresol novolac resin.

15. A composition in accordance with claim 11 wherein the polyepoxide is the diglycidyl ether of 2,2-bis(parahydroxyphenyl)propane.

16. A composition in accordance with claim 11 wherein the polyepoxide is a cycloaliphatic polyepoxide having an epoxide equivalent of more than 65.

17. A composition in accordance with claim 11 wherein the aluminum acylate (C) is selected from the group consisting of aluminum stearates and aluminum benzoates.

18. A cured composition in accordance with claim 5.

19. A cured composition in accordance with claim 11.

20. A method comprising
(I) mixing,
   (A) an organosilicon compound containing at least one silicon-bonded hydroxyl group;
   (B) a compound containing an average of more than one epoxy group;
   (C) a catalytic amount of an aluminum compound selected from the group consisting of aluminum trihydroxide, aluminum alcoholates, aluminum acylates, salts of aluminum acylates and alkoxides, aluminosiloxy compounds and aluminum chelates and
   (D) an organohydriosilicon compound containing at least one silicon-bonded hydrogen atom per molecule in an amount sufficient to provide no more than 0.1 percent by weight of silicon-bonded hydrogen based on the combined weight of (A) and (B), said organosilicon compound (A) being present in an amount sufficient to provide at least 0.1 silicon-bonded hydroxy groups per epoxy group in (B), and said substantially anhydrous mixture being curable to a hard resinous material,
(II) surrounding an article with the mixture before said mixture cures, and
(III) allowing the surrounding mixture to cure.

21. The method of claim 20 wherein the organosilicon compound is a phenylpolysiloxane resin having a degree of substitution of from 1.0 to 1.7, a phenyl to silicon ratio of from 0.2 to 1.5 and a silicon-bonded hydroxyl content of from 2.5 to 10 weight percent; the epoxy compound is a polyepoxide selected from the group consisting of glycidyl ethers of polyphenols and cycloaliphatic polyepoxides and the organosilicon compound is present in an amount sufficient to provide from 0.5 to 1.5 silicon-bonded hydroxyl groups for every epoxy group in the polyepoxide.

22. The method of claim 21 wherein the mixture comprises a solid filler in an amount of from 30 to 90 percent by weight based on the total weight of the mixture.

23. The method of claim 22 wherein the aluminum compound is an aluminum stearate or an aluminum benzoate.

24. The method of claim 23 wherein the organohydriosilicon compound is a poly(methylhydriosiloxane).

25. The method of claim 24 wherein the article is an electrical or an electronic device.

26. The method of claim 25 wherein the article is an integrated circuit.

27. The method of claim 26 wherein an integrated circuit protected from water is obtained.

28. An article produced by the method of claim 20.

29. The article produced by the method of claim 27.

* * * * *

UNITED STATES PATENT AND TRADEMARK OFFICE
CERTIFICATE OF CORRECTION

PATENT NO. : 4,082,719
DATED : April 4, 1978
INVENTOR(S) : Donald T. Liles, et al.

It is certified that error appears in the above-identified patent and that said Letters Patent are hereby corrected as shown below:

Column 5, line 11, the word "p,p'-dihydroxybenzpohenone" should read --p,p'-dihydroxylbenzophenone--.

Column 6, lines 35-36, the word "di-isopropoxidecresyl" should read --diisopropylcresyl--.

Column 7, line 20, the word "reaced" should read --reacted--.

Column 7, line 49, the word "OF" should read --Of--.

Column 7, line 59, the words "borated" and "stearated" should read --borate-- and --stearate--.

Column 7, line 61, the word "extend" should read --extent--.

Column 8, line 63, the word "from" should read --form--.

Column 8, line 66, the word "alos" should read --also--.

Column 9, line 8, the formula "-$CH_2CH_2$--$C_6H_4$-," should read -- -$CH_2CH_2$-, -$C_6H_4$-, --.

Column 9, line 32, the word "varyover" should read --vary over--.

Column 9, line 66, the word "Trimetylsiloxane-" should read -- Trimethylsiloxane- --.

Column 10, line 11, delete the last word "the".

UNITED STATES PATENT AND TRADEMARK OFFICE
CERTIFICATE OF CORRECTION

PATENT NO. : 4,082,719

DATED : April 4, 1978

INVENTOR(S) : Donald T. Liles, et al.

It is certified that error appears in the above-identified patent and that said Letters Patent are hereby corrected as shown below:

Column 11, line 48, the word "3,4-epoxycylohexyl-" should read -- 3,4-epoxycyclohexyl- --.

Column 12, line 56, the word "not" should read --no--.

Column 13, line 44, the word "comositions" should read --compositions--.

Signed and Sealed this

Eighteenth Day of November 1980

[SEAL]

Attest:

SIDNEY A. DIAMOND

Attesting Officer

Commissioner of Patents and Trademarks